Jan. 31, 1956  R. E. HAWKINS  2,732,715
LIQUID LEVEL GAUGE
Filed Feb. 15, 1954
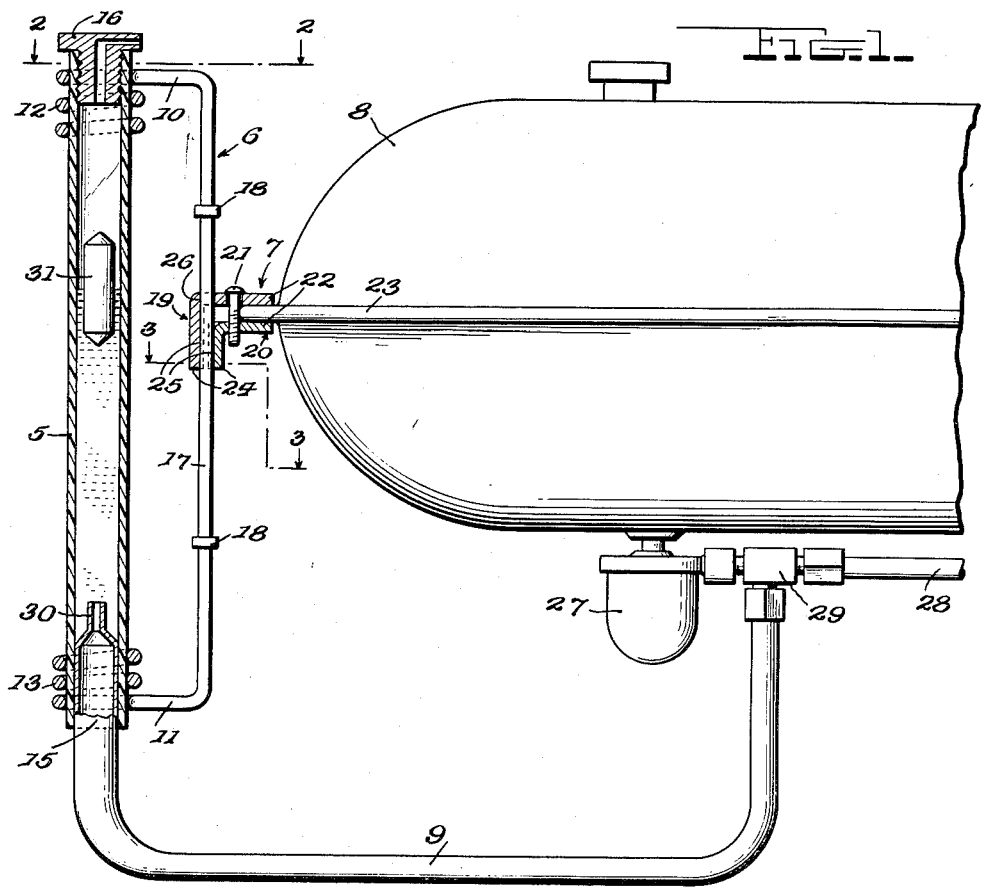
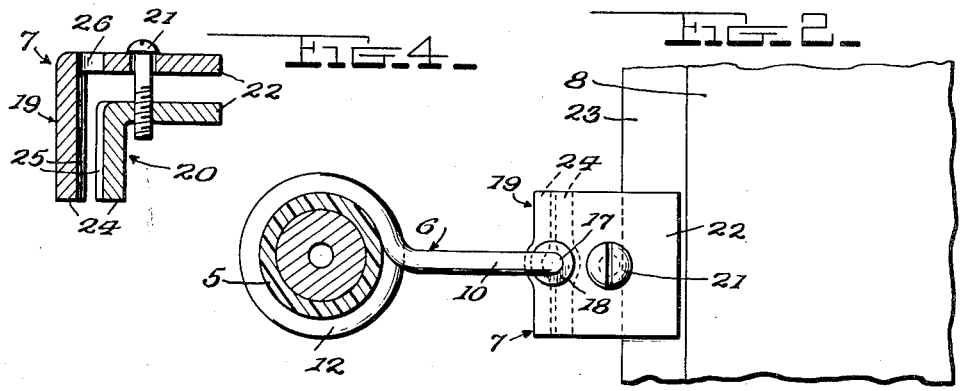
INVENTOR
Robert E. Hawkins
BY
ATTORNEY

United States Patent Office 2,732,715
Patented Jan. 31, 1956

2,732,715
LIQUID LEVEL GAUGE
Robert E. Hawkins, Arcadia, Ind.

Application February 15, 1954, Serial No. 410,309

1 Claim. (Cl. 73—323)

This invention relates to liquid level gauges for fuel and other liquid tanks and is of the general type having a transparent tube at the exterior of the tank in which the liquid level is always the same as in the tank.

The principal object of the invention is to provide an unusually simple and inexpensive gauge which may be easily mounted and placed in communication with the tank and may be read at a glance.

Another object of the invention is to provide a novel gauge in which the transparent tube may be formed from a modern resilient plastic and will not therefore be subject to breakage. A liquid conducting tube which places the tank in communication with the transparent tube, has an upturned end snugly received in the lower end of said transparent tube, and a vented plug is inserted into the upper end of the latter.

A further object of the invention is to provide a novel bracket for supporting the transparent tube and for holding its ends liquid-tightly around the upturned end of the liquid conducting tube and the vented plug.

A still further object is to provide novel clamp means for mounting the bracket upon the fuel tank and permitting any necessary vertical adjustment when initially mounting the gauge.

With the above and other objects in view that will become apparent as the nature of the invention is better understood, the same consists in the novel form, combination and arrangement of parts hereinafter more fully described, shown in the accompanying drawing, and particularly pointed out in the appended claim.

In the drawing:

Fig. 1 is a side elevation, partly in section, showing the gauge operatively connected with a tank;

Figs. 2 and 3 are enlarged horizontal sectional views on lines 2—2 and 3—3 of Fig. 1, respectively; and Fig. 4 is an enlarged vertical sectional view of the attaching clamp.

The construction shown in the drawing will be rather specifically described, but it is to be understood that variations may be made within the scope of the invention as claimed.

A straight vertical tube 5 is provided, said tube being formed from a modern transparent resilient plastic. A vertically elongated bracket 6 and a clamp 7 are employed for mounting this tube 5 on a tank 8, and a liquid conducting metallic tube 9 is provided for placing the lower end of said tube 5 in communication with the tank 8.

The bracket 6 is formed from a single length of stiff wire, the ends of which are bent laterally to form upper and lower horizontal arms 10 and 11, the outer end portions of said arms being bent to form upper and lower coils 12 and 13. These coils are alined and tightly receive the ends of the resilient tube 5. The lower end of this tube 5 snugly receives the upturned end 15 of the liquid conducting tube 9, and into the upper end of said tube 5, a vented plug 16 is threaded. The coils 12 and 13 snugly hold the ends of the tube 5 and hold said ends tightly engaged with the tube end 15 and plug 16 respectively.

The intermediate portion 17 of the bracket 6 is straight and vertically positioned, and the clamp 7 is slidable along said portion 17 until tightened, excessive sliding, however, being prevented by stops 18. The permitted sliding of the clamp 7, prior to tightening, allows proper positional adjustment of the gauge with respect to the tank 8 and tightening of said clamp maintains the adjustment.

The clamp 7 is composed of two L-shaped members 19 and 20, and a screw 21 connecting said members. The member 20 is disposed within the angle of the member 19. The horizontal arms 22 of the members 19 and 20 are connected by the screw 21 and their free ends constitute jaws for clamping by engaging the lateral seam flange 23 of the tank 8. The vertical arms 24 of these members 19 and 20 are disposed at opposite sides of the vertical portion 17 of the bracket 6 and constitute jaws for clamping this bracket portion 17. Both of the vertical arms 24 are preferably channeled on their opposed faces at 25 to engage the bracket portion 17, and the horizontal arm 22 of the member 19 has an opening 26 through which said bracket portion 17 extends.

When the arms 22 are engaged with the flange 23 and the screw 21 is tightened, the two clamp members 19 and 20 are relatively moved to clamp both the flange 23 and the portion 17 of the bracket 6. In this connection, it will be observed that during tightening of the screw 21, there is a tendency for the clamp members 19 and 20 to relatively rock about the flange 23 as a fulcrum and this causes the vertical arms 24 to tightly grip the bracket portion 17. Thus, the single clamp 7 secures the attachment to the tank and maintains the position to which the tube 5 has been adjusted.

A sediment bulb 27 and discharge line 28 have been shown for the tank 8, and between these elements, a suitable fitting 29 may be injected to place the tube 9 in communication with said tank. The upturned end 15 of the tube 9 is preferably restricted at 30 to prevent surging of the liquid in the transparent tube 5, and this tube contains a conspicuous float 31. A mere glance at this float tells the level of the liquid in the tank 8.

From the foregoing, it will be seen that a novel and advantageous device has been provided for the desired purpose, and while there is herein shown and described the preferred embodiment of the invention, it is nevertheless to be understood that minor changes may be made therein without departing from the spirit and scope of the invention as claimed.

I claim:

A liquid level gauge comprising a transparent tube having a vent at its upper end, means for placing the lower end of said tube in communication with a tank, a bracket carrying said tube and having a vertically elongated rod-like portion at one side of said tube and an attaching clamp, said clamp having horizontal tank-engaging jaws to clamp a part of a tank, said clamp further having vertically depending bracket engaging jaws to clamp said vertically elongated bracket portion, the clamp comprising two spaced L-shaped members and a threaded fastener connecting the horizontal arms of said L-shaped members and spaced from the vertical arms of these members which are disposed at opposite sides of said vertically elongated bracket portion, the opposed faces of the vertical arms being longitudinally channeled to accommodate the rod-like portion of the bracket, and the upper horizontal arm having an opening therein aligned with the channeled portions for the passage of the rod-like portion of the bracket.

References Cited in the file of this patent

UNITED STATES PATENTS

| | | |
|---|---|---|
| 1,065,283 | Threadgold | June 17, 1913 |
| 1,281,840 | Roffy | Oct. 15, 1918 |
| 1,532,477 | De Turk | Apr. 7, 1925 |
| 2,593,172 | Neumann | Apr. 15, 1952 |

FOREIGN PATENTS

| | | |
|---|---|---|
| 563,984 | Great Britain | May 18, 1943 |